(12) United States Patent
Geagan, III et al.

(10) Patent No.: US 6,263,371 B1
(45) Date of Patent: Jul. 17, 2001

(54) METHOD AND APPARATUS FOR SEAMING OF STREAMING CONTENT

(75) Inventors: John B. Geagan, III, San Jose; Michael D. Kellner, Santa Clara; Alagu S. Periyannan, Fremont, all of CA (US)

(73) Assignee: Cacheflow, Inc., Fremont, CA (US)

( * ) Notice: Subject to any disclaimer, the term of this patent is extended or adjusted under 35 U.S.C. 154(b) by 0 days.

(21) Appl. No.: 09/329,963

(22) Filed: Jun. 10, 1999

(51) Int. Cl.[7] ........................................ G06F 15/16
(52) U.S. Cl. ................................ 709/231; 709/232
(58) Field of Search ............................. 709/231, 230, 709/234, 235, 236, 239, 242, 246; 370/540, 545, 538; 714/4

(56) References Cited

U.S. PATENT DOCUMENTS

| | | | |
|---|---|---|---|
| 5,315,591 | 5/1994 | Brent et al. | 370/85.6 |
| 5,327,426 | 7/1994 | Dolin, Jr. et al. | 370/85.13 |
| 5,499,245 | 3/1996 | Lee et al. | 370/79 |
| 5,511,208 | 4/1996 | Boyles et al. | 395/800 |

(List continued on next page.)

OTHER PUBLICATIONS

"Real Broadcast Network: White Paper", *Real Broadcast Network*; 9 pp.; Apr. 19, 1999.

Michael A. Goulde; "Network Caching Guide: Optimizing Web Content Delivery"; *Patricia Seybold Group*; pp. 1–42, Mar. 1999.

"Save on Bandwidth Costs While Maximizing Playback quality to Consumers", *Real Networks*; available at http://www.real.com/solutions/update/realproxy.html, 2 pages; downloaded Jun. 10, 1999.

"RealProxy Cache", *Real Networks*; available at http://www.real.com/solutions/update/realproxy datasheet.html, 3 pages; downloaded Jun. 10, 1999.

"Streaming Media Caching Brief", Inktomi Corporation; avaiable at http://www.inktomi.com/products/traffic/tech/streaming.html, 3 pages; downloaded Jun. 10, 1999.

Perkins C, et al.: "A survey of packet loss Recovery Techniques for Streaming Audio" IEEE Network: The Magazine of Computer Communications, IEEE Inc. New York, US, vol. 12, No. 5, Septembert 1998 (1998–09), pp. 40–48, XP000875014.

Chinen K & Yamaguchi S: "An interactive Preferching Proxy Server for Omprovement of WWW Latency" Proceeding of Inet: The Internet: the Global Frontiers, vol. 1/3, Jun. 8, 1997, XP002086569.

PCT–Search Report PCT/US00/11080 Dec. 12, 2000.

* cited by examiner

*Primary Examiner*—Mehmet B. Geckil
(74) *Attorney, Agent, or Firm*—Blakely Sokoloff Taylor & Zafman LLP (57) ABSTRACT

In the face of unacceptable data loss on connections between a content source and a content consumer, additional connections therebetween are opened. These additional connections are preferably opened between the content source and a proxy disposed between the content source and the content consumer. The proxy may then seam together data streams received from the content source across the additional connections before passing a resultant seamed stream to the content consumer. The seamed stream may be constructed by filling in information gaps in any of the data streams received from the content source with content derived from others of the data streams received from the content source. This derivation may be made on the basis of identifying characteristics (e.g., packet sequence numbers and/or time stamps) common throughout each of the data streams received from the content source.

30 Claims, 4 Drawing Sheets

U.S. PATENT DOCUMENTS

| | | |
|---|---|---|
| 5,515,380 | 5/1996 | Giger . |
| 5,539,745 | 7/1996 | Chang et al. ............... 370/85.13 |
| 5,539,749 | 7/1996 | Eul . |
| 5,602,836 * | 2/1997 | Papadopoulos et al. ............ 370/280 |
| 5,644,507 | 7/1997 | Ostrover et al. ............... 364/514 |
| 5,657,452 | 8/1997 | Kralowetz et al. ............ 395/200.57 |
| 5,751,968 | 5/1998 | Cohen ........................ 395/200.61 |
| 5,768,525 | 6/1998 | Kralowetz et al. ............ 395/200.58 |
| 5,790,770 | 8/1998 | McClure et al. ............... 395/200.61 |
| 5,793,978 | 8/1998 | Fowler ........................ 395/200.56 |
| 5,802,320 | 9/1998 | Baehr et al. .................. 395/200.79 |
| 5,822,540 | 10/1998 | Caldara et al. ................ 395/200.66 |
| 5,878,231 | 3/1999 | Baehr et al. .................. 395/200.75 |
| 5,884,025 | 3/1999 | Baehr et al. .................. 395/187.01 |
| 5,905,872 | 5/1999 | DeSimone et al. ............ 395/200.75 |
| 5,918,013 | 6/1999 | Mighdoll et al. ............... 395/200.47 |
| 5,931,904 | 8/1999 | Banga et al. .................. 709/217 |
| 5,941,988 * | 8/1999 | Bhagwat et al. ............... 713/201 |
| 5,944,780 | 8/1999 | Chase et al. .................. 709/201 |
| 5,946,294 | 8/1999 | Stein .......................... 370/221 |
| 5,951,646 | 9/1999 | Brandon ...................... 709/231 |
| 5,963,551 | 10/1999 | Minko ......................... 370/356 |
| 5,996,015 | 11/1999 | Day et al. .................... 709/226 |
| 6,003,089 | 12/1999 | Shaffer et al. ................. 709/233 |
| 6,006,273 | 12/1999 | Ostrover et al. ............... 709/247 |
| 6,041,355 | 3/2000 | Toga ........................... 709/227 |
| 6,085,252 * | 7/2000 | Zhu et al. ..................... 709/231 |
| 6,098,108 * | 8/2000 | Sridhar et al. ................. 709/239 |
| 6,105,064 * | 8/2000 | Davis et al. ................... 709/224 |

METHOD AND APPARATUS FOR SEAMING OF STREAMING CONTENT

FIELD OF THE INVENTION

The present invention relates to a scheme for merging together information from multiple input data streams to produce an output data stream that includes fewer information "gaps" than any of the individual input data streams. In one example, the scheme is applied to live broadcasts of streaming content delivered via the Internet.

BACKGROUND

The Internet is a vast and expanding network of networks of computers and other devices linked together by various telecommunications media, enabling all these computers and other devices to exchange and share data. Sites on the Internet provide information about a myriad of corporations and products, as well as educational, research and entertainment information and services. An estimated 30 million people worldwide use the Internet today, with 100 million predicted to be on the "net" in a matter of years.

A computer or resource that is attached to the Internet is often referred to as a "host." Examples of such resources include conventional computer systems that are made up of one or more processors, associated memory (typically volatile and non-volatile) and other storage devices and peripherals that allow for connection to the Internet or other networks (e.g., modems, network interfaces and the like). In most cases, the hosting resource may be embodied as hardware and/or software components of a server or other computer system that includes an interface, which allows for some dialog with users thereof. Generally, such a server will be accessed through the Internet (e.g., via Web browsers such as Netscape's Navigator™ and Communicator™ and Microsoft's Internet Explorer™) in the conventional fashion.

Briefly, if an Internet user desires to establish a connection with a host (e.g., to view a Web page located thereat), the user might enter into a Web browser program the URL (or Web address) corresponding to that host. One example of such a URL is "http://www.domain.com". In this example, the first element of the URL is a transfer protocol (most commonly, "http" standing for hypertext transfer protocol, but others include "mailto" for electronic mail, "ftp" for file transfer protocol, and "nntp" for network news transfer protocol). The remaining elements of this URL (in this case, "www" standing for World Wide Web—the Internet's graphical user interface—and "domain.com") are an alias for the "fully qualified domain name" of the host.

Each fully qualified domain name, in its most generic form, includes three elements. Taking "computer.host.com" as an example, the three elements are the hostname ("computer"), a domain name ("host") and a top-level domain ("com"). Further, each fully qualified domain name is unique throughout the Internet and corresponds to a numerical Internet protocol (IP) address. IP addresses facilitate communications between hosts and clients in the same way that physical addresses (e.g., 123 Main Street, Anytown, Anycity) facilitate correspondence by mail. Each IP address is made up of four groups of numbers separated by decimals. Thus, in the case of the hypothetical host "computer.domain.com", the corresponding IP address might be 123.456.78.91. A given host looks up the IP addresses of other hosts on the Internet through a system known as domain name service.

Thus, once a URL is entered into a browser, the corresponding IP address is looked up in a process facilitated by a top-level server. In other words, all queries for addresses are routed to certain computers, the so-called top-level servers. The top-level server matches the domain name to an IP address of a domain name server capable of directing the inquiry to the computer hosting the sought after Web page (or other content) by matching an alphanumeric name such as www.domain.com with its numeric IP address.

In addition to Web pages and the like, more and more Internet users are accessing multimedia content (e.g., files that include high quality graphical images, movies and/or sound). This creates difficulties because such files are usually quite large while the bandwidth available through the Internet is limited. Thus, in order to make multimedia files usable, streaming is often employed.

With conventional files (e.g., data files), clients (e.g., Web browsers) completely download the requested content before viewing it. This technique works well for relatively small files, but often suffers from unacceptable (from the point of view of the user) delays when large multimedia files are involved. Streaming is the term given to a technique wherein a client downloads a portion of a file, decompresses (if necessary) that portion, and starts playing the contents thereof (e.g., audio and/or video) before the rest of the file arrives. A buffer of information is built up before playback starts, so as to prevent underflows if the remaining data is delayed during transmission. Furthermore, subsequent portions of the multimedia file are downloaded during playback to keep the buffer relatively full. This technique thus accommodates the downloading and playing of large multimedia files without incurring lengthy delays before the content is available for viewing.

Multimedia files are often transported over the Internet using special transport protocols. For example, the real-time transport protocol (RTP) provides delivery service for multimedia applications and also provides means for multimedia applications to work over networks. RTP does not, however, provide guaranteed or in-sequence delivery (and hence it is referred to as an unreliable transport protocol), but does provide a packet sequence number that can be used to detect missing packets and to reconstruct an original transmission sequence.

RTP usually carries data in the form of packets, using the user datagram protocol (UDP) as the delivery mechanism. UDP provides a "wrapper" around data packets, with the wrapper providing for multiplexing and demultiplexing as well as error checking services. Essentially, a UDP packet is made up of a UDP header and UDP data encapsulated as the data portion of an IP packet. The IP packet itself includes an IP header (which includes the address information discussed above) as well as the user data (i.e. the multimedia content of interest) as a payload.

In some cases, RTP is used with other protocols, such as the transmission control protocol (TCP). Unlike UDP, TCP provides a reliable, error-free, full-duplex channel between two computers. TCP uses IP to transfer data, but provides mechanisms to take care of lost or duplicated IP datagrams (i.e., packets) and to ensure proper sequencing thereof. Thus, TCP provides reliable end-to-end transport, ensuring that what is received is an exact duplicate of what is transmitted.

Where broadcasts of "live" information are concerned, RTP usually uses UDP as the delivery transport. This is because TCP may introduce unacceptable delays in receipt. Further, when an application starts an RTP session, a second port for communication according to the real time control protocol (RTCP) is opened. RTCP works in conjunction with RTP to provide flow control and congestion control services.

The idea is that the exchange of RTCP packets between a client and server can be used to adjust the rate of transmission of the RTP packets, etc.

Associated with RTP is the real time streaming protocol (RTSP). RTSP is a client-server multimedia presentation control protocol that control functionality such as content type, interactive stream control, error mitigation, bandwidth negotiation, multicast, live broadcasting and monitoring. Just as HTTP transports HTML (hypertext markup language—an instruction set that allows an HTTP client to render a desired image, etc.), RTSP handles data. The difference is that while HTTP clients always make requests and HTTP servers always service those requests, RTSP is bi-directional, with both servers and clients making requests and servicing them. RTSP accomplishes data transfer using TCP or UDP.

Thus, RTSP is a generally a TCP connection over which commands are sent and responses are returned. Clients negotiate data channels with servers via SETUP commands. These channels typically specify that data will be sent as RTP/RTCP "packets", but the transport type may be specified and/or modified as part of the negotiation. Further, the negotiations may determine whether the packets will be sent over TCP (e.g., as binary packet data imbedded in an RTSP command stream via an escape sequence) or UDP (e.g., as true packets).

The RTP portion of a channel contains actual media data for single stream flows (e.g., compressed audio data). In contrast, an RTCP portion of a channel (which typically is assigned one UDP port number or TCP channel number larger than the RTP port number or channel—for example, UDP port 6970 for RTP and 6971 for RTCP) usually contains clock-synchronization data and client-server control/status messages. As indicated above, RTP data typically flows in one direction, from the server to the client. RTCP packets are typically sent in both directions, for example as client status report messages and server status report messages.

The following dialog illustrates (from a client's point of view) a portion of an RTSP session wherein a media description is retrieved and the single audio stream specified thereby is played. Those of ordinary skill in the art will recognize that this is a "live" stream as opposed to prerecorded content, as is evident from the absence of a "range" tag in the session description protocol (SDP). In the initial client-to-server communication, a request to describe the stream located at a particular Web address (rtsp:// qt.macroradio.net/gogaga) is sent, along with suggested connection parameters, such as a bandwidth:
Send data (130 bytes).
<00000000<DESCRIBE rtsp://qt.macroradio.net/gogaga RTSP/1.0
<00000033<CSeq: 1
<0000003C<Accept: application/sdp
<00000055<Bandwidth: 112000
<00000068<User-Agent: QTS/1.0b22
<00000080<
The server responds with a description of the stream as part of an SDP:
Receive data (566 bytes).
>00000000>RTSP/1.0 200 OK
>00000011>Server: QTSS/v65
>00000023>Cseq: 1
>0000002C>Content-Type: application/sdp
>0000004B>Content-Base: rtsp://qt.macroradio.net/gogaga/
>0000007B>Content-length: 420
>00000090>
>00000092>v=0
>00000097>o=3134316689 3134906918 IN IP4 192.231.139.83
>000000C7>s=GoGaGa Brand Radio
>000000DD>i=<<A9>>1999—All rights reserved -
>000000FF>u=http://www.macroradio.net
>0000011C>a=x-qt-text-nam:GoGaGa Brand Radio
>00000140>a=x-qt-text-cpy:<<A9>>1999—All rights reserved
>0000016D>a=x-qt-text-cpy:(c) 1999 ERC: The Eclectic Radio Company,
>000001A7>LLC.
>000001AD>t=3134316689 3134320289
>000001C6>c=IN IP4 0.0.0.0
>000001D8>a=control:*
>000001E5>m=audio 0 RTP/AVP 97
>000001FB>a=rtpmap:97 X-QT
>0000020D>a=x-bufferdelay:10
>00000221>a=control:trackID=1
The client then defines conditions for a playback, using a specified port:
Send data (143 bytes).
<00000082<SETUP rtsp://qt.macroradio.net/gogaga/trackID=1 RTSP/1.0
<000000BC<CSeq: 2
<000000C5<Transport: RTP/AVP;unicast;client_port=6970-6971
<000000F7<User-Agent: QTS/1.0b22
<0000010F<
The server responds with the port address from which it will play:
Receive data (165 bytes).
>00000236>RTSP/1.0 200 OK
>00000247>Server: QTSS/v65
>00000259>Cseq: 2
>00000262>Session: 1411920655;timeout=60
>00000282>Transport: rtp/avp;source=192.231.139.182;server_port=2000-2001;
>000002C2>client_port=6970-6971
>000002D9>
The client then initiates play back using the specified port addresses:
Send data (125 bytes).
<00000111<PLAY rtsp://qt.macroradio.net/gogaga RTSP/1.0
<00000140<CSeq:3
<00000149<Range: npt=0.000000—
<0000015F<Session: 1411920655
<00000174<User-Agent: QTS/1.0b22
<0000018C<
In response, the server begins playing the selected stream:
Receive data (92 bytes).
>000002DB>RTSP/1.0 200 OK
>000002EC>Server: QTSS/v65
>000002FE>Cseq: 3
>00000307>Session: 1411920655
>0000031C>RTP-Info: url=trackID=1
>00000335>

At this point, RTP media data and RTCP control packets will start flowing between the specified UDP ports, i.e., RTP data from server port 2000 to client port 6970, and RTCP packets between server port 2001 and client port 6971. Note that the server's address 192.231.139.182 can be seen in the SETUP response above. An example of an RTCP packet transmitted from the client (port 6971) to the server (port 2001) is shown below:

```
Send packet data to port 1 (84 bytes).
<00000000< 80 C9 00 01 00 00 62 76 81 CA 00 12 00 00 62 76   ......bv......bv
<00000010< 01 0D 51 54 53 20 38 30 35 32 31 38 36 39 33 02   ..QTS 805218693.
<00000020< 13 51 75 69 63 6B 54 69 6D 65 20 53 74 72 65 61   .QuickTime Strea
<00000030< 6D 69 6E 67 06 1A 51 75 69 63 6B 54 69 6D 65 20   ming..QuickTime
<00000040< 53 74 72 65 61 6D 69 6E 67 2F 31 2E 30 62 32 32   Streaming/1.0b22
<00000050< 00 00 00 D2                                       ....
```

If one were to decode the data, it may translate to "client received 5% loss and 123456 bytes and client "name" is 'QuickTime Streaming' client".

An RTCP packet sent from the server (port 2001) to the client (port 6971) may resemble the following:

```
Receive packet data from 192.231.139.182:2001 (108 bytes).
>00000000> 80 C8 00 06 00 00 45 38 BA F0 68 00 42 1F 8E 44   ......E8..h.B..D
>00000010> 3D 25 45 EB 00 E7 A3 3F BB 8C 3A 78 81 CA 00 13   =%E....?..:x....
>00000020> 00 00 45 38 01 18 51 54 53 40 6C 6F 63 61 6C 68   ..E8..QTS@localh
>00000030> 6F 73 74 20 31 35 36 31 36 31 35 34 36 39 02 13   ost 1561615469..
>00000040> 51 75 69 63 6B 54 69 6D 65 20 53 74 72 65 61 6D   QuickTime Stream
>00000050> 69 6E 67 06 13 51 75 69 63 6B 54 69 6D 65 20 53   ing..QuickTime S
>00000060> 74 72 65 61 6D 69 6E 67 00 FF 00 40               treaming...@
```

Once decoded, this information may state, "RTP time t means universal (wall clock) time y and server "name" is "QuickTime Streaming server". This is essentially a reference to an absolute reference time source used by the server.

The actual RTP media packets transmitted from the server (port 2000) to the client (port 6970) may resemble the following:

```
Receive packet data from 192.231.139.182:2000 (200 bytes).
>00000000> 80 E1 BC 73 3D 21 F8 1B 00 00 45 38 14 00 80 01   ...s=!....E8....
>00000010> 02 B6 4B 19 09 14 80 9E 5D 26 35 24 88 64 2A 20   ..K....]&5$.d*
>00000020> D0 C2 98 16 92 55 41 9C 82 46 16 35 9D A8 D7 27   ....UA..F.5...'
>00000030> 13 1A B7 37 D6 E4 05 5B 40 AF E7 11 D3 84 9C B8   ...7...[@......
>00000040> 45 8D 51 01 F1 A4 C5 97 0B 58 88 2A 4A D1 C4 13   E.Q......X.*J...
>00000050> FC 8C 58 A5 46 8A A2 3B 63 66 6F 23 2F 38 1B 61   ..X.F.;cfo#/8.a
>00000060> 0B 15 2A D3 49 22 C9 98 C8 0F 16 40 1A 53 9D A8   ..*.I".....@.S..
>00000070> 79 F1 CE EE C6 19 B1 26 C5 A8 CB 4D 4B 3B F3 73   y......&...MK;.s
>00000080> 4C 6A 33 5F D3 5F 2C 46 60 84 C0 08 14 14 26 EC   Lj3_._,F.....&.
>00000090> 5E DF 49 49 48 B5 B3 02 5F 88 F5 EC 29 10 AB 72   .IIH..._...)..r
>000000A0> A6 D8 3E D4 9A D2 14 2A 6F 86 AD 22 9E 0B 4C 50   ..>....*o..".LP
>000000B0> 5C BC 0B 88 6D 13 0C 34 3C 44 CB 92 BB 6B 1B 18   \...m..4<D...k..
>000000C0> 51 1C 7D 12 01 00 00 00                           Q.}.....
```

Finally, upon conclusion of the playback or at some other point, the client may decide to quit, so an instruction is passed to server over RTSP (the TCP connection is still open during the playback) to stop everything on this "session":
Send data (107 bytes).
<0000018E<TEARDOWN rtsp://qt.macroradio.net/gogaga RTSP/1.0
<000001C1<CSeq: 4
<000001CA<Session: 1411920655
<000001DF<User-Agent: QTS/1.0b22
<000001F7<

Although these and other transport protocols exist, there still exist problems with the viewing of streaming content over public networks or networks of networks such as the Internet. For example, whenever unreliable transport protocols (e.g., RTP) are used, there can be significant data loss between the content source (e.g., the server) and the content consumer (i.e., the client), depending on the network traffic conditions. If this loss is high (e.g., 10% or more), the viewing quality can be degraded to the point where it is unacceptable to a user.

Others have attempted to solve this problem (improved viewing quality or, more generally, improved user experience in the face of data loss), but have primarily concentrated on trying to make the transport of information from source to client more reliable. Thus, for example, others have attempted to use TCP rather than UDP as the transmission protocol. Although TCP guarantees that all packets that make up a file will arrive and will be in sequence when ultimately played out, it does so by requesting retransmissions of any lost packets. This not only introduces delay into any playback (e.g., while waiting for lost packets to be retransmitted), it also adds to the total volume of network traffic thus leading to still further packet loss due to congestion and the like. The delays introduced by the use of TCP often mean that the ultimate user experience is poor, and perhaps even less acceptable than would be the case if lost packets were simply overlooked.

Other solutions have proposed using network bandwidth reservation protocols in place of unreliable transmission protocols. Unfortunately, such protocols are not always available end-to-end, and so this solution is not always an option.

Another strategy for dealing with the loss of data between the source and the requesting client is to control the amount of data being transmitted. Where possible, clients that are experiencing significant data loss may instruct the server to send less data. Thus, in the scenario of a streaming movie, the server may be instructed to send only key frames and not any (or perhaps just a few) difference frames. However, this strategy is only successful where the data loss is due to actual bandwidth overloading at the client and not due to other factors in the intervening network. For example, if the packet loss is due to consistent buffer overflow at the receiver, instructing the server to send less data may prevent such overflows and provide a better user experience. Where, however, packet loss is due to overall network congestion, instructing the server to send less data will have no effect on the packet loss, because the insignificant reduction in the total number of packets within the network due to the stream under consideration will not be sufficient to dramatically affect the packet loss rate for that stream. The net result will simply be roughly the same packet loss rate over a fewer number of transmitted packets—leading to an even worse condition.

What is needed, therefore, is a new solution to the problem of dealing with data loss during the broadcast of live, streaming content.

SUMMARY OF THE INVENTION

In one embodiment, two or more data streams, each made up of a number of packets, that are received from a content source (e.g., a server) across one or more computer networks (e.g., the Internet) using an unreliable media transmission protocol (e.g., RTP) are seamed together at a proxy disposed between the content source and one or more content consumers. This allows for the provision of one or more output data streams to the one or more content consumers (e.g., web browsers) that include fewer missing packets than any individual one of the data streams being received at the proxy from the content source. The seaming operation generally includes packets from at least one of the data streams received from the content source in the output data streams.

In a further embodiment, one or more additional connections between a content consumer and a content source are opened in response to an indication that data loss between the content source and the content consumer over one or more existing connections therebetween has reached an unacceptable level (e.g., as defined by a threshold). These additional connections are preferably opened between the content source and a proxy disposed between the content source and the content consumer. The proxy may seam together data streams received from the content source across the additional connections before passing a resultant seamed stream to the content consumer. The seamed stream may be constructed by filling in information gaps in any of the data streams received from the content source with content derived from others of the data streams received from the content source. This derivation may be made on the basis of identifying characteristics (e.g., packet sequence numbers and/or time stamps) common throughout each of the data streams received from the content source.

Other features and advantages of the present invention will be apparent from the following discussion.

BRIEF DESCRIPTION OF THE DRAWINGS

The present invention is illustrated by way of example, and not limitation, in the figures of the accompanying drawings in which like reference numerals refer to similar elements and in which.

DETAILED DESCRIPTION

Disclosed herein is a scheme for seaming together multiple streams of streaming content broadcast over a public network or network of networks such as the Internet. In essence, a proxy (transparent or explicit) is introduced between a content source (e.g., a server) and one or more clients (e.g., Web browsers, or plug-ins therefor, configured to play streaming content or other multimedia viewers, other proxies, playback devices, etc.), preferably at a location that is close (e.g., physically or logically) to the clients. Herein, the term proxy is meant to describe and/or refer to a device that resides logically between a client and server, or other content source, and that processes information flowing there between in some manner. Proxies may be physically co-located with clients and/or servers and/or may be stand-alone devices. Data streams from the source are received at the proxy and from there are routed to the requesting clients. En route, each stream can be buffered and any information gaps (e.g., due to packet loss) in the received streams can be filled using information from other server-source streams. A resulting "seamed" stream can be provided from the proxy to one or more of the clients, with the seamed stream having fewer information gaps than any of the received streams from the source. An additional benefit of this approach is that multiple clients may share the seamed stream, thus reducing the overall traffic flow that might otherwise be experienced if the multiple clients were each to open a separate session with the content source. Even where only a single client is requesting the streaming content, the present scheme provides a new approach in data delivery by allowing for multiple concurrent sessions (each perhaps using a different communication path) to be opened with the content source, allowing for the seaming approach to be used.

Although discussed with reference to certain illustrated embodiments, upon review of this specification, those of ordinary skill in the art will recognize that the present scheme may find application in a variety of systems, perhaps with one or more minor variations. Therefore, in the following description the illustrated embodiments should be regarded as exemplary only and should not be deemed to be limiting in scope. Further, it should be kept in mind that some portions of the detailed description that follows are presented in terms of algorithms and symbolic representations (e.g., through the use of flow diagrams, etc.) of operations on data within a computer memory. These algorithmic descriptions and representations are the means used by those skilled in the computer science arts to most effectively convey the substance of their work to others skilled in the art.

An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared and otherwise manipulated. It has proven convenient at times, principally for reasons of common usage, to refer to these signals as bits, values, elements, symbols, characters, terms, numbers or the like. It should be borne in mind, however, that all of these and similar terms are to be associated with the appropriate physical quantities and are merely convenient labels applied to these quantities.

Moreover, unless specifically stated otherwise, it will be appreciated that throughout the description of the present scheme, use of terms such as "processing", "computing", "calculating", "determining", "displaying", "rendering" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices. Again, these are the terms and descriptions commonly used by and among practitioners of ordinary skill in the relevant arts.

Figure 1:
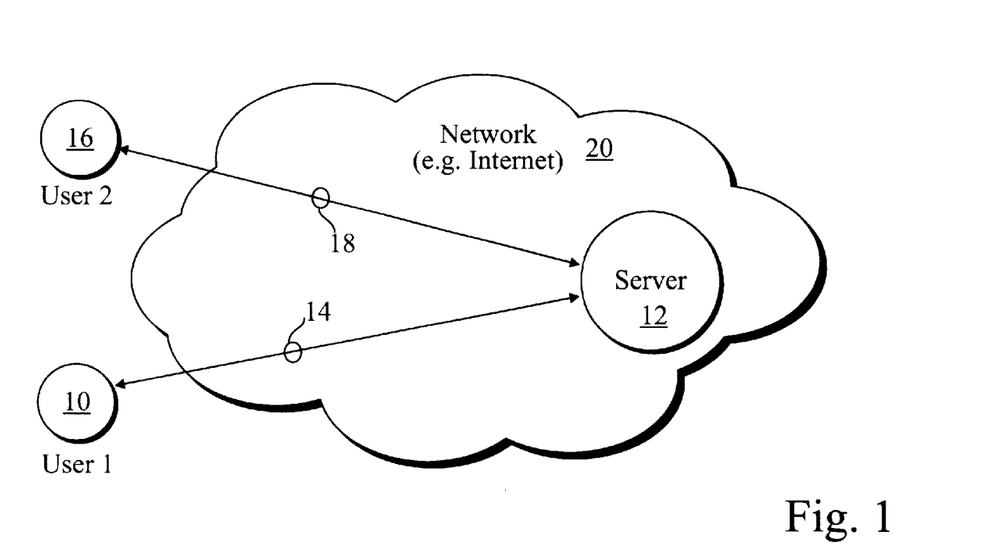
FIG. 1 illustrates a situation in which individual users have connected to a content source using independent connections across the Internet.

Turning now to FIG. 1, some further details regarding the basic problem outlined above can be stated. In general, when seeking to view live, streaming content over an Internet or other network connection, a user 10 will connect to the content's source (e.g., server 12). This connection 14 will allow for the transport of the streaming content, usually according to one of the protocols for multimedia transmission discussed above. Now, when a second user 16 wishes to view the same broadcast, he or she will open a separate connection 18 across the network (e.g., the Internet) 20 to server 12. Thus, the content that is being downloaded by user 10 is the same content that is being downloaded by user 16. This duplication of material adds to network congestion and (especially as this scenario is repeated many times over for further users) can contribute to packet loss on each of the connections.

Figure 2:
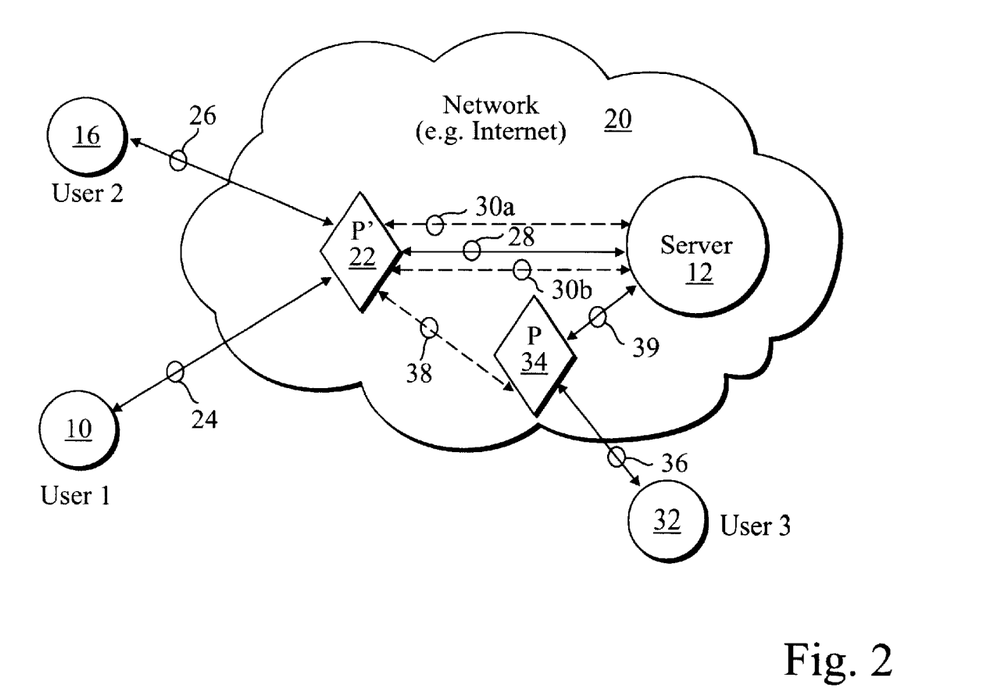
FIG. 2 illustrates the use of proxies disposed in communication paths between a content source and one or more content consumers in accordance with an embodiment of the present scheme.

To combat this and the other problems described above, the present scheme introduces a proxy between the content source (e.g., server 12 or another proxy) and the users 10 and 16, as shown in FIG. 2. Proxy 22 is introduced in the connection between content source and content users, preferably as close to the last physical media link to the users as possible. Thus, the proxy 22 may be situated at the point a user's dial up Internet connection is terminated (e.g., as deployed by an Internet service provider as part of a modem bank). Now, when a user (or more particularly a client application being run on a computer platform operated by a user) connects to server 12, the connection actually passes through proxy 22. Thus, user 10 has a connection (e.g., a dial up connection) 24 to proxy 22, while user 16 has a separate connection 26 thereto. Streams that are downloaded from server 12 may be routed over a single connection 28 to proxy 22 before being passed to each user 10 and 16 over the individual user connections 24 and 26. By reducing the volume of data being downloaded from server 12 in this fashion, the overall network congestion is reduced and fewer packet losses may be experienced.

Unfortunately, simply introducing the proxy 22 into the path between multiple users and the content source may not be sufficient to bring packet loss to a point where optimum viewing conditions are available for the users. Depending upon the overall traffic conditions within network 20, there may still be significant packet loss on connection 28 between server 12 and proxy 22. Thus, a further aspect of the present scheme is the introduction of data seaming.

Data seaming is a counter-intuitive process by which, in the face of significant data loss, even more data than was originally being broadcast is requested. This is counter-intuitive because the conventional approach to dealing with data loss is to reduce the amount data being transmitted between source and client in the hope that this will reduce congestion and allow for improved communication. Data seaming takes the opposite approach and actually causes more information to be downloaded from the source, with the goal being to stitch together, or seam, packets from different input streams or traffic flows into an output stream that has fewer information gaps than any of the input streams.

FIG. 2 illustrates this concept. In the face of significant packet loss over connection 28 (e.g., when the number of missing packets per interval of unit time reaches a threshold—a quantity which can be determined using the sequence numbers present in the packet headers, etc.), proxy 28 opens one or more additional connections 30a and/or 30b to server 12. Each of these new connections 30a and/or 30b (of which there may be one or more depending upon traffic conditions, the number of clients being served, the number of packets being lost on the primary connection 28, etc.) will transport the same data that is being transported across connection 28. However, because the packet loss on each connection 28, 30a and 30b is a random or pseudo-random process, it is likely that packets that are dropped over connection 28 will appear over at least one of connections 30a and 30b. Thus, the information gaps caused by the missing packets from connection 28 can be filled in using the packets from one of these new connections 30a and/or 30b. Then, the resulting output streams that are played out to the users 10 and 16 over connections 24 and 26 can be the "seamed" streams that include packets from multiple ones of the proxy-server connections 28, 30a and 30b.

Figure 3:
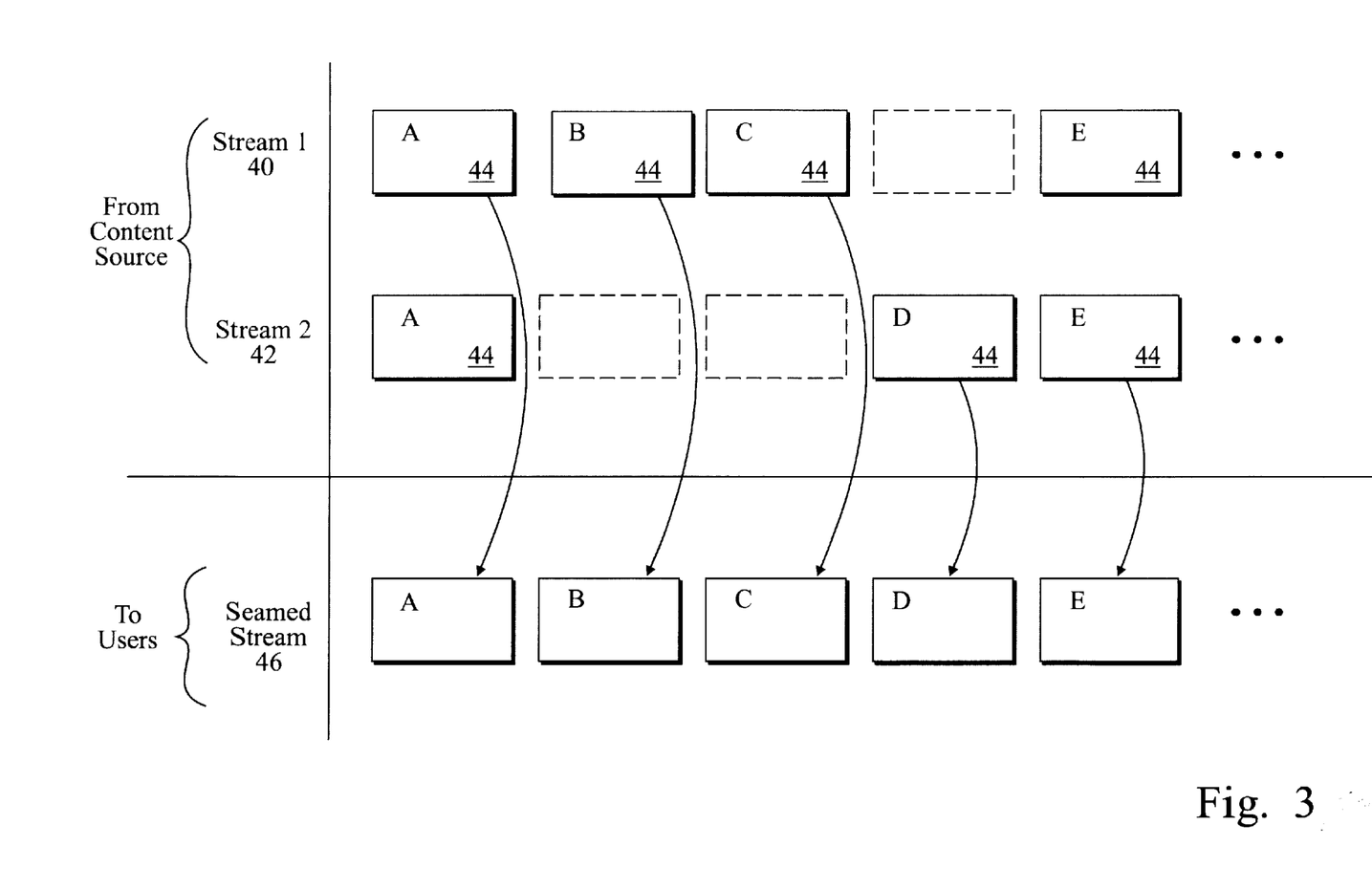
FIG. 3 illustrates a seaming operation from a conceptual standpoint in accordance with an embodiment of the present scheme.

FIG. 3 further illustrates this seaming process. Assume that two information streams 40 and 42 are inbound to a proxy from a content source. These streams 40 and 42 may be (and in some cases preferably are) routed over different paths within network 20. Thus, it can be expected that the packet losses on each of the two streams will be different. Importantly, the two streams 40 and 42 represent the same content and the individual packets 44 that make up the streams are uniquely identified in some fashion. For example, where the packets 44 are transported according to RTP (as is the case for much streaming content on the Internet), unique sequence numbers (shown as letter designators A, B, C, . . . in the figure) are available to differentiate the packets from one another. Because the streaming content is "live", the same sequence numbers or time stamps may (typically will) identify the same information packets 44 in each stream 40 and 42. Note this may not be the typical case for the playback of stored content, where different streams may include data (e.g., started from different points within a movie, etc) identified by different sequence numbers or time stamps. Also, even for live content in some cases the sequence numbers may be shifted so time stamps may need to be compared/used to identify corresponding packets within different streams.

If the sequence numbers or time stamps of packets of different streams are not the same, they can be normalized before the seaming operation is performed. For example, an RTCP stream associated with downloaded content may include timestamp information that is transmitted periodically. This timestamp information is correlated to an absolute reference clock (e.g., the wall clock noted above) for a particular server, so one can deduce an offset from that clock for a particular stream and/or a number of streams. By comparing these different offsets one can then align similar packets and retrieve sequence number offsets therefor for each stream. In this way, the streams can be aligned. Of course, over time errors (e.g., due to numerical rounding) may be introduced so it may be necessary to compare, periodically, actual packet contents on a byte-by-byte or hash value basis or by using some other comparison mechanism or method to maintain this inter-stream synchronization.

By monitoring the sequence numbers in a stream, the proxy can detect missing packets (shown in dotted outline in the figure) and substitute a packet from another stream in the output. So, the proxy may begin playing out a seamed stream 46 using packets A, B and C from stream 40. Then, upon detecting a missing packet in stream 40, the proxy may look to stream 42 to provide packet D to the seamed stream. After this point, the proxy has the option of returning to stream 40 to look for the next packet (E) in line, or it may continue to choose packets from stream 42 (as shown in the figure) until a gap in that stream is encountered. Regardless of which option is used, the resulting output seamed stream 46 includes fewer information gaps that the input streams from which it is created.

In the event none of the input streams have a packet to fill a gap, the seamed stream will likewise include an information gap at that point. Nevertheless, if enough input streams are used, and/or those streams are received over sufficiently different routes, it is expected that the number of information gaps in the seamed stream will remain less than the number of gaps in any one input stream. As network conditions improve, the number of alternate input streams (i.e., alternative proxy-source connections) could be reduced. For example, one or more lossy streams could be closed down.

Returning to FIG. 2 then, users 10 and 16 can be provided with seamed streams on connections 24 and 26, respectively. In addition, an additional user 32 that connects to a second proxy 34 over a connection (e.g., a dial up connection) 36 can take advantage of the seamed stream. The proxies 22 and 34 may be communicatively coupled by a connection 38 (e.g., so as to form a virtual private network within network 20), thus providing a communication path from proxy 22 to user 32 that would allow for the reception of the same seamed stream that is being provided to users 10 and 16. In addition or alternatively, proxy 34 may open yet another connection 39 to server 12, and provide a further seamed stream (i.e., filling in any gaps in the stream provided by proxy 22 with packets received over connection 39) to user 32. Of course, the number of users, proxies and/or connections communicatively coupling these elements to one another and/or to server 12 is variable and is not critical to the broader spirit and concepts involved with the present scheme.

Figure 4:
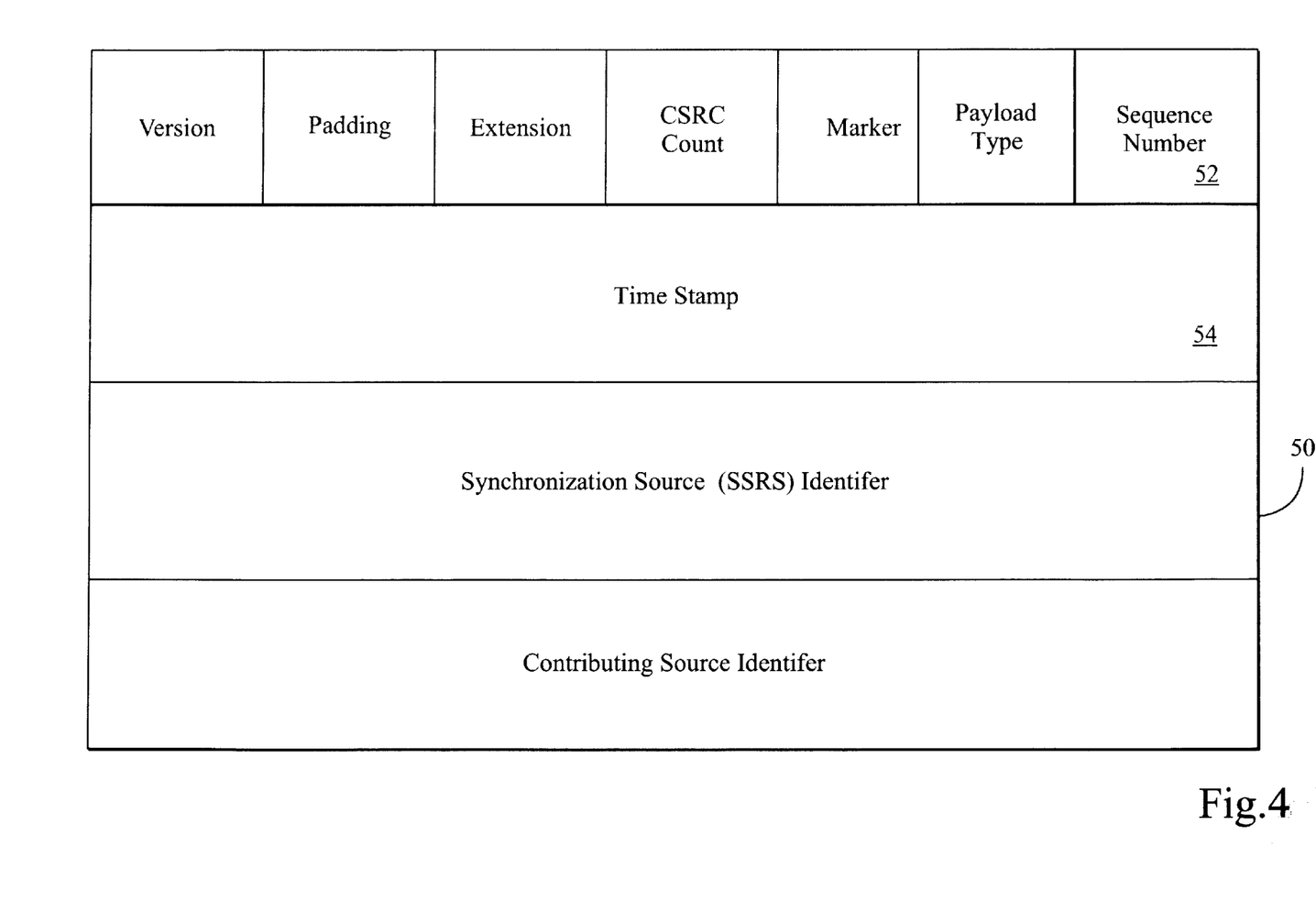
FIG. 4 illustrates an RTP packet header showing a sequence number field useful in seaming operations performed in accordance with an embodiment of the present scheme.

As mentioned above, where RTP is used to transport streaming content between the content source and the proxy, the sequence numbers within the RTP packets may be used to assist in building a seamed stream. For sake of clarity, FIG. 4 illustrates an RTP packet header 50, including the sequence number field 52. Sequence number field 52 is a sixteen-bit field that is sequentially incremented for each RTP packet transmitted by the content source. Other transmission protocols may include similar identifying sequence numbers or representations that can be exploited to allow for seaming together two or more information streams.

In other cases, a protocol header may not include a sequence number, but may include a timestamp, such as is found in timestamp field 54. For RTP packets, the timestamp is a thirty-two-bit value that reflects the sampling interval of the first octet in the RTP data packet. This value is derived from a clock source at the content source. Similar timestamp fields are used with other transmission protocols and at least in the case of live streaming content, the timestamp values of two packets having similar data but being transmitted on different streams and/or connections (logical and/or physical) may be equal (or similar enough) so as to permit the identification of information gaps and corresponding available packets for insertion therein. Of course, other protocols will have other identifying characteristic values that will permit such identification and insertion, thus allowing for the seaming of information streams in a manner consistent with the present scheme.

Figure 5:
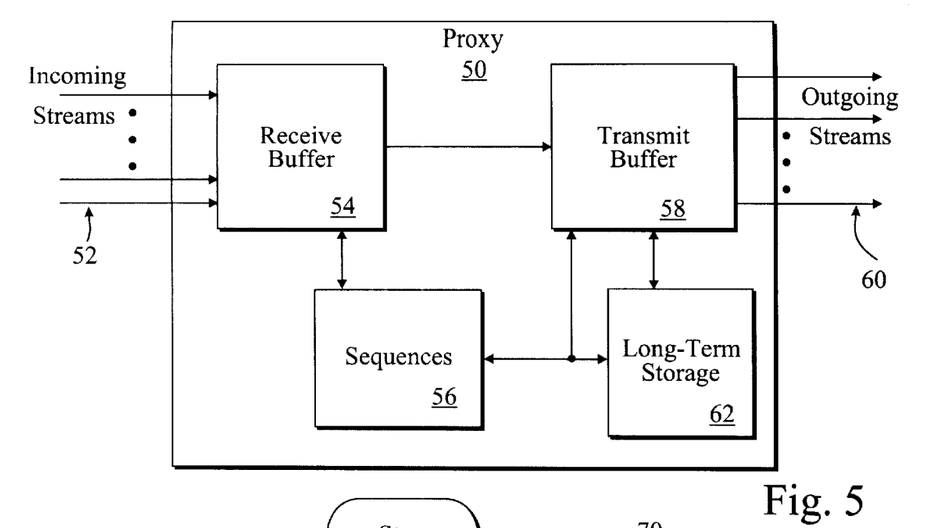
FIG. 5 illustrates a functional depiction of a proxy configured to perform seaming operations in accordance with an embodiment of the present scheme.

Now turning to FIG. 5, one possible implementation of a proxy 50 is illustrated. It should be appreciated that this illustration does not show all of the components that may be needed to allow operation of the proxy in a real network. Rather, the focus is on the functional components that may be used to accomplish a data seaming operation.

Shown in the figure is a case where multiple input streams 52 (e.g., from multiple physical or logical connections to a content source) are applied to a receive buffer 54. Receive buffer 54 may, in practice, be a shared memory operated under the control of a memory controller that processes the incoming streams 52 so as to store data packets thereof in one or more logical queues (which may themselves be implemented as linked lists of buffers). Thus, the data packets that make up the input streams 52 are stored in a fashion that allows their respective sequence number (and/or other identifying criteria) and stream/connection to be identified.

Sequencer 56, which may be a general or special purpose processor and/or a custom integrated circuit configured to carry out the sequencing operations described herein, is responsible for examining the various packets from each of the input streams and assembling one or more seamed streams within transmit buffer 58. That is, sequencer 56 is responsible for collecting and transferring to the transmit buffer 58 (which again may be a shared memory and/or a linked list of buffers), the packets that will make up the seamed outgoing stream(s) 60. Packets may be played out of transmit buffer 58 at a rate optimized for a receiving client under the control of sequencer 56 or a memory controller (not shown). In some cases, the seamed stream may also be stored in a long-term storage unit 62 (e.g., a memory, tape storage unit, CD-ROM or other computer-readable data storage device). This will facilitate later playback of the seamed stream (e.g., for later viewing by those who missed the "live" broadcast, or even for viewers requesting an on-demand instant replay).

Figure 6:
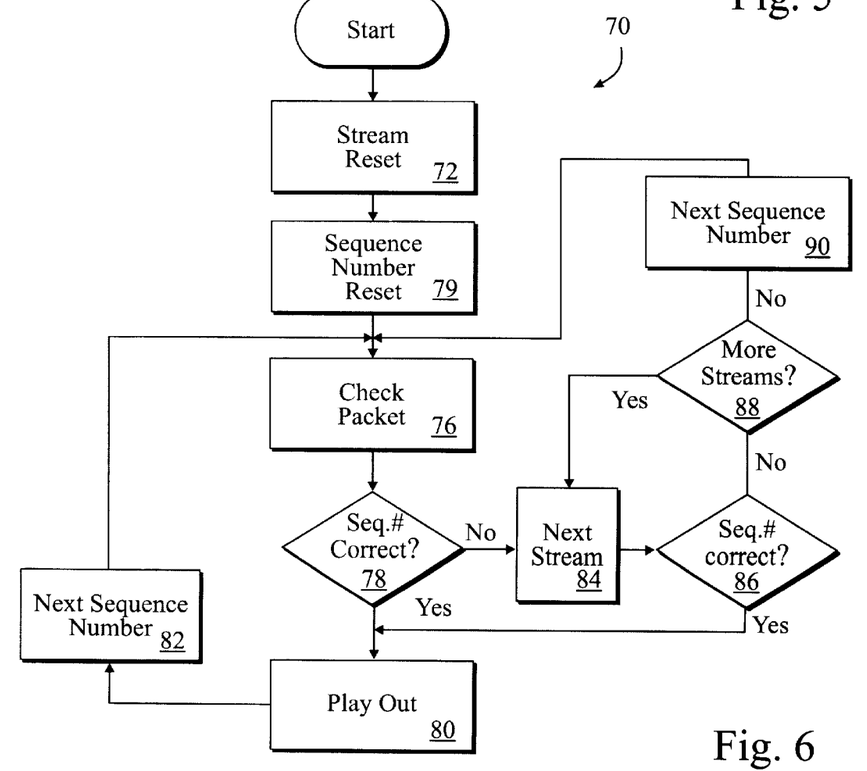
FIG. 6 illustrates a sequence of operations to be performed by a sequencer for the proxy shown in FIG. 5 in accordance with an embodiment of the present scheme.

One example of the manner in which sequencer 56 may be configured is illustrated in the flow diagram of FIG. 6. Process 70 begins with sequencer 56 resetting internal counters used for a stream number (step 72) and sequence number (step 74). These counters will allow the sequencer 56 to step through the different input streams, looking for a next packet in sequence to apply to the seamed stream in transmit buffer 58. Thus, these counters need only be reset for each new seamed stream to be assembled. Note the counters need not be reset to an absolute starting point (e.g., 0 or 1), rather, they may be reset to the lowest sequence number value for packets received in any incoming stream.

Once the stream and sequence number counters are initialized, the sequence number of the first packet of the input stream pointed to by the stream number counter is examined (step 76) and compared against the sequence number counter value (step 78). Essentially, sequencer 56 is now beginning the process of assembling the output seamed stream, so the first packet in that seamed stream needs to be found and passed to transmit buffer 58. Thus, if the value of the sequence number counter and the sequence number of the packet under examination match, then that packet is next in line for the seamed stream and it is played out to the transmit buffer (step 80). The process can then continue by incrementing the sequence number (step 82) and checking for the next packet in line.

Whenever the value of the sequence number counter and the sequence number of the packet under examination do not match, this is an indication that a packet is missing from the stream under consideration. For example, referring back to FIG. 3, if the sequencer 56 were examining packets from stream 40 for inclusion in seamed stream 46, the sequence number counter may be initialized to "A". Then, for each of packets A, B and C of stream 40, the sequence number counter would match the packet sequence number and so those packets from stream 40 would be played out to the transmit buffer 58. However, when the sequence number counter was incremented to "D", the next packet examined from stream 40 would not have a matching sequence number. Instead, that packet would have a sequence number "E" (remember the "D" packet is missing from stream 40).

Upon detecting this mismatch, the sequencer would increment the stream number counter (step 84, FIG. 6) and examine the next packet from the stream now pointed to (step 86). Thus, for the example shown in FIG. 3, the stream counter may have incremented to point at stream 42, and packet "D" from that stream would have a matching sequence number. Note, not shown in the flow diagram but implied by this discussion is that the sequencer may have to examine some or all of the incoming streams in parallel so as to keep its pointers in the various streams lined up. In any event, having found the next packet in sequence, packet "D" from stream 42 may be played out to the transmit buffer 58.

If the next stream in line did not have the sought after packet, the stream number could be further incremented if other input streams were available (step 88). Otherwise, if no further streams were available, then the sequence number counter would be incremented (step 90) and the seamed stream would simply contain a gap in packet sequence numbers. Note that using the process illustrated in FIG. 6, sequencer 56 chooses packets from a stream until a missing packet is detected, and then switches streams (as shown in FIG. 3). An alternative approach would be to recycle back to the same starting stream each time and include the next packet in sequence from the first queried stream that includes the desired packet. Still a further approach would be to examine each stream (or some number thereof) in parallel for the next packet in sequence and choose the desired packet from any stream that included it (perhaps on a round robin or even a priority basis). Any of these approaches may be implemented and each is within the broader spirit and scope of the present seaming scheme.

An additional advantage provided by the present scheme is the short buffering interval experienced through the insertion of a proxy in a communication path between a content source and a user. This buffering provides an opportunity for the proxy to reorder any out-of-order packets before transmitting the seamed stream. Thus, the receiving client device need not cope with out-of-order packets. Also, the transmit rate from the proxy to the user can be adjusted to be optimal for the client device being employed, thus reducing the possibilities of underflows or overflows at the client.

Opening additional proxy-server connections can be done at any time, regardless of the number of users connected to the proxy. In the above discussion with respect to FIG. 2, the example of two concurrent users was used, however, the additional connections 30a and/or 30b could be opened between proxy 22 and server 12 even if user 10 is the only user requesting the streaming content. Some of these connections could even make use of different transport protocols (e.g., TCP) to guarantee packet delivery and/or different transmission paths (perhaps even through other proxies located closer to the content source). Then, if at a later time user 16 connects, that user can take advantage of the seamed stream produced for user 10, by having it duplicated over connection 26.

Thus a scheme for seaming together multiple streams of streaming content broadcast over a public network or network of networks has been described. Although the foregoing description and accompanying figures discuss and illustrate specific embodiments, it should be appreciated that the present invention is to be measured only in terms of the claims that follow.

What is claimed is:

1. A method, comprising seaming together two or more input data streams of common content, each made up of a number of packets, being received from a content source across one or more computer networks using an unreliable media transmission protocol at a proxy disposed between the content source and one or more content consumers so as to provide one or more output data streams to the or more content consumers, each of the output data streams including packets from multiple ones of the input data streams and including fewer missing packets than any individual one of the input data streams being received at the proxy from the content source.

2. The method of claim 1 wherein the transmission protocol comprises real-time transmission protocol (RTP).

3. The method of claim 1 wherein at least one of the content consumers comprises a plug-in for a Web browser.

4. The method of claim 1 wherein the seamed data streams are recorded as a seamed stream at the proxy.

5. The method of claim 1 wherein the proxy is physically co-located at one of the content consumers.

6. The method of claim 1 wherein the content source comprises a second proxy.

7. A method, comprising opening one or more additional connections between a content consumer and a content source in response to an indication that data loss between the content source and the content consumer over one or more existing connections therebetween has reached an unacceptable level.

8. The method of claim 7 wherein the unacceptable level is defined by a threshold.

9. The method of claim 7 wherein the one or more additional connections are opened between the content source and a proxy disposed between the content source and the content consumer.

10. The method of claim 9 wherein the proxy seams together data streams received from the content source across the additional connections before passing a resultant seamed stream to the content consumer.

11. The method of claim 10 wherein the proxy constructs the seamed stream by filling in information gaps in any of the data streams received from the content source with content derived from others of the data streams received from the content source.

12. The method of claim 11 wherein the content is derived from others of the data streams on the basis of identifying characteristics common throughout each of the data streams received from the content source.

13. The method of claim 12 wherein the identifying characteristics comprise packet sequence numbers.

14. The method of claim 12 wherein the identifying characteristics comprise time stamps.

15. The method of claim 12 wherein the identifying characteristics of each of the data streams received from the content source are normalized prior to any comparisons.

16. The method of claim 7 further comprising closing down one or more of the connections between the content consumers and the content source.

17. The method of claim 7 wherein one or more of the additional connections comprise alternative network routes to the content source.

18. The method of claim 17 wherein at least one of the alternative network routes includes a proxy.

19. A proxy configured to be coupled to one or more content consumers and a content source and further configured to open additional connections to the content source in response to an indication that data loss between the content source and one or more of the content consumers over one or more existing connections therebetween has reached an unacceptable level.

20. The proxy of claim 19 wherein the unacceptable level is defined by a threshold.

21. The proxy of claim 19 being further configured to seam together data streams received from the content source across the additional connections before passing a resultant seamed stream to the one or more content consumers.

22. The proxy of claim 21 being further configured to construct the seamed stream by filling in information gaps in any of the data streams received from the content source with content derived from others of the data streams received from the content source.

23. The proxy of claim 22 wherein the content is derived from others of the data streams on the basis of identifying characteristics common throughout each of the data streams received from the content source.

24. The proxy of claim 23 wherein the identifying characteristics comprise packet sequence numbers.

25. The proxy of claim 23 wherein the identifying characteristics comprise time stamps.

26. The proxy of claim 21 being further configured to close down one or more of the connections between the content consumers and the content source.

27. The proxy of claim 21 wherein one or more of the additional connections comprise alternative network routes to the content source.

28. The proxy of claim 27 wherein at least one of the alternative network routes includes another proxy.

29. The proxy of claim 23 further configured to record the seamed data streams.

30. The proxy of claim 23 wherein the identifying characteristics of each of the data streams received from the content source are normalized prior to any comparisons.

* * * * *